United States Patent [19]

Jackson, Jr. et al.

[11] Patent Number: 4,578,453

[45] Date of Patent: Mar. 25, 1986

[54] HIGH MOLECULAR WEIGHT POLYESTERS

[75] Inventors: Winston J. Jackson, Jr.; Joseph J. Watkins, both of Kingsport, Tenn.

[73] Assignee: Eastman Kodak Company, Rochester, N.Y.

[21] Appl. No.: 674,117

[22] Filed: Nov. 23, 1984

[51] Int. Cl.$^4$ .................. C08G 63/16; C08G 63/18; C08G 63/68

[52] U.S. Cl. .................. 528/302; 528/299; 528/305; 528/307; 528/308

[58] Field of Search ............... 528/302, 305, 299, 308

[56] References Cited

U.S. PATENT DOCUMENTS

| | | | |
|---|---|---|---|
| 2,901,466 | 8/1959 | Kibler et al. | 528/302 X |
| 3,033,822 | 5/1962 | Kibler et al. | 528/305 X |
| 4,107,150 | 8/1978 | Campbell et al. | 528/302 X |
| 4,201,859 | 5/1980 | Agarwal | 528/302 |

*Primary Examiner*—Lucille M. Phynes
*Attorney, Agent, or Firm*—John F. Stevens; William P. Heath, Jr.

[57] ABSTRACT

A high molecular weight polyester suitable for use in forming shaped articles, the polyester having an inherent viscosity of greater than 0.4 and containing repeating units from a glycol component consisting essentially of 1,3-cyclohexanedimethanol, 1,4-cyclohexanedimethanol or mixtures thereof, and an acid component comprising at least 50 mole % of an alicyclic or aromatic dicarboxylic anhydride or corresponding acid having 6 to 30 carbon atoms.

10 Claims, No Drawings

HIGH MOLECULAR WEIGHT POLYESTERS

DESCRIPTION

1. Technical Field

This invention relates to high molecular weight, melt processable polyesters from 1,3- or 1,4-cyclohexanedimethanol and alicyclic or aromatic dicarboxylic anhydrides or the corresponding dicarboxylic acids. These polyesters are useful for forming molded objects, extruded films and coatings.

2. Background of the Invention

We are aware of no disclosures in the art of high molecular weight polyesters from 1,3- or 1,4-cyclohexanedimethanol and alicyclic or aromatic dicarboxylic anhydrides or corresponding dicarboxylic acids having 6 to 30 carbon atoms such as o-phthalic acid or o-phthalic anhydride. Conventional esterification procedures do not permit the production of high molecular weight polyesters from these glycols and acids.

Poly(ethylene o-phthalate) has been prepared by the reaction of ethylene carbonate with phthalic anhydride. U.S. Pat. No. 3,457,236 discloses a melt fusion method for preparing moderate to high-molecular weight polyesters and copolyesters from phthalic anhydride. This patent contains no reference to polyesters or copolyesters of cyclohexanedimethanol with phthalic anhydride.

The art dealing with the homopolyesters of cyclohexanedimethanol with phthalic anhydride is limited. In all cases, the polyester is of low-molecular weight. U.S. Pat. Nos. 3,985,825 and 3,979,477 disclose the use of low-molecular weight homopolyester as a component of epoxy group containing resins. U.S. Pat. No. 4,000,214 discloses the use of low-molecular weight homopolyester as a component of a polyurethane additive for epoxy resins. The homopolyesters revealed in these patents have a molecular weight too low to be useful for the manufacture of shaped objects.

DISCLOSURE OF THE INVENTION

According to the present invention, there is provided a high molecular weight polyester suitable for use in forming shaped articles, the polyester having an I.V. of at least 0.4 (preferably at least 0.5) and containing repeating units from 1,3- or 1,4-cyclohexanedimethanol and at least one alicyclic or aromatic dicarboxylic anhydride or corresponding dicarboxylic acid having 6 to 30 carbon atoms.

In a preferred embodiment of the invention, there is provided a high molecular weight polyester suitable for use in forming shaped articles, the polyester containing repeating units from a glycol component consisting essentially of 1,3-cyclohexanedimethanol, 1,4-cyclohexanedimethanol or mixtures thereof, and an acid component comprising at least 50 mole %

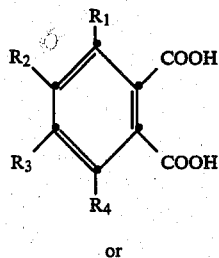

or

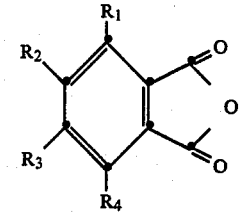

wherein $R_1$ through $R_4$ are each hydrogen, chlorine, bromine or alkyl groups containing 1 to 4 carbon atoms.

Glycols which may be used to make the polyesters of this invention consist essentially of 1,3-cyclohexanedimethanol; 1,4-cyclohexanedimethanol, or mixtures thereof. Cis or trans configurations, or combinations thereof, may be used. These glycols are commercially available.

The acid component comprises at least 50 mole % of at least one alicyclic or aromatic dicarboxylic anhydride or corresponding dicarboxylic acid (anhydride group attached to adjacent carbon atoms in the ring) having 6 to 30 carbon atoms. The preferred acid component is o-phthalic acid or o-phthalic anhydride which are commercially available materials. Other suitable acid components include 1,2-cyclohexanedicarboxylic anhydride; 4-cyclohexene-1,2-dicarboxylic anhydride; 2,3-norbornanedicarboxylic anhydride and 5-norbornene-2,3-dicarboxylic anhydride. The acid component may contain up to 50 mole % of an aliphatic, dicarboxylic acid or anhydride having from 3 to 12 carbon atoms, an aliphatic dicarboxylic acid having 6 to 20 carbon atoms, or an aromatic dicarboxylic acid having 8 to 12 carbon atoms. Examples of these dicarboxylic acids include dimethylmalonic acid, adipic acid, 1,4-cyclohexanedicarboxylic acid, isophthalic acid, methylphthalic acid, chloroterephthalic acid, and dichloroterephthalic acid.

In preparing the polyesters according to the present invention, it is important to make sure anhydrides used as a reactant are completely dehydrated prior to use to insure an accurate determination of mole percentages. If the anhydride has been allowed to absorb water, accurate measurements are not possible. If the corresponding acids are used, they must be anhydrous for the same reason.

The polyesters of this invention are prepared from substantially equimolar amounts of the glycol component and the acid component. In order to prepare high-molecular weight polyesters from these materials, a process is used which involves conducting the esterification/polyesterification reaction in a refluxing solvent in the presence of a catalyst and azeotroping out the water produced. The reactants are heated to a temperature of about 110° C. to about 180° C. in the refluxing solvent with removal of the by-product, water, and return of the condensed solvent vapors to the reaction vessel. After the theoretical yield of water has been collected, the solvent may be removed by distillation.

The polyesters of this invention may also contain pigments, glass fibers, asbestos fibers, antioxidants, plasticizers, lubricants, and other additives.

In forming the polyesters according to this invention, it is essential that substantially equimolar amounts of the glycol and acid components be used in the reaction mixture. Only slight imbalances of the acid and glycol will limit the molecular weight of the resulting polyesters. By the term "substantially equimolar amounts" it is means that the mole percent of glycol and acid in the reaction mixture should be within 1% and preferably within 0.5% of each other.

A requirement for the solvent used as the reaction medium is that the finished polyester must be soluble therein. It is not necessary that the monomers be completely soluble in the solvent. Also, the solvent must form an azeotrope with water, but not with any of the monomers. Many conventional aromatic hydrocarbon solvents meet these requirements. Preferred solvents include those having boiling points of about 110° C.–180° C. such as benzene, and $C_1$–$C_4$ alkyl substituted benzenes, and chloro-substituted benzenes. Useful solvents include toluene, xylene, cumene, p-cymene, and chlorobenzene, and o-dichlorobenzene. Fortunately the anhydrides of this invention do not azeotrope out of the reaction mixture with these solvents.

The catalysts used in preparing the polyesters according to this invention must cause the esterification and polyesterification reactions to proceed at lower temperatures than the conventional metallic melt-phase esterification catalysts. Acid catalysts are useful, and the preferred catalyst is n-butylstannoic acid, because polymers containing this catalyst are more stable on standing. Other useful catalysts include p-toluenesulfonic acid, methanesulfonic acid, and sulfuric acid. The catalyst is present at levels of 0.1–5.0 wt. %, based on theoretical polymer yield, with about 1.0 wt. % preferred.

The polyesters of this invention can be injection molded by conventional techniques to produce transparent, shaped objects. The polyesters also can be extruded by conventional techniques into transparent films and sheeting. The polyesters also can be dissolved in solvents such as toluene, xylene, chlorobenzene or methylene chloride for the production of coatings.

Inherent viscosities are determined at 25° C. in 60/40 phenol/1,1,2,2-tetrachloroethane at a concentration of 0.5 g/mL.

The following examples are submitted for a better understanding of the invention.

EXAMPLE 1

Phthalic anhydride is heated at 200° C. at atmospheric pressure under nitrogen for two hours (to convert any phthalic acid present to the anhydride) before it is weighed into the reaction vessel. A mixture of 149.5 g (1.01 mole) phthalic anhydride, 145.6 g (1.01 mole) 1,4-cyclohexanedimethanol (30/70 cis/trans ratio), 2.70 g (1.0 wt %) p-toluenesulfonic acid and 50 mL xylene is placed into a 500 mL, three-neck, round-bottom flask equipped with a stirrer, a nitrogen inlet, and a Dean-Starke trap with condenser. The mixture is stirred at 138°–140° C. until the theoretical yield of water has been collected in the trap (11 hr). The trap is then removed, and a fitting with provision for application of vacuum is installed. Vacuum (0.2 mm Hg) is applied at 160° C. for 1.0 hr to remove the solvent. A viscous, transparent, light-amber polyester is obtained. The polyester has an inherent viscosity of 0.72 and a glass transition temperature of 58° C. (determined on a Perkin-Elmer DSC-2 differential scanning calorimeter). A film (5 mil) pressed at 170° C. is transparent and tough.

The polyester is molded at 150° C. by conventional techniques to give transparent molded objects. Injection-molded bars have a tensile strength of 9300 psi and a flexural modulus of $4.3 \times 10^5$ psi.

The polyester is soluble in toluene, xylene, p-cymene, chlorobenzene, o-dichlorobenzene, and methylene chloride.

EXAMPLE 2

Following the procedure described in Example 1, omitting the initial heating step, a polyester is prepared from 1:1 molar ratio mixture of o-phthalic acid and 1,4-cyclohexanedimethanol (70/30 cis/trans ratio). The polyester is amber and transparent and has an I.V. of 0.48.

EXAMPLE 3

Following the procedure described in Example 1, a polyester is prepared from a 1:1 molar ratio mixture of phthalic anhydride and trans-1,4-cyclohexanedimethanol. The polyester is amber and transparent and has an I.V. of 0.61, and a glass transition temperature of 66° C. (determined on a Perkin-Elmer DSC-2 differential scanning calorimeter).

EXAMPLE 4

Following the procedure described in Example 1, a polyester is prepared from a 1:1:2 molar ratio mixture of 4-chlorophthalic anhydride, chloroterephthalic acid, and 1,4-cyclohexanedimethanol (30/70 cis/trans ratio). The polyester is dark amber and transparent and has an I.V. of 0.50.

EXAMPLE 5

A mixture of 59.2 g phthalic anhydride, 1.1 g p-toluenesulfonic acid and 100 mL xylene is placed into a 500-mL, three-neck, round-bottom flask equipped with a stirrer, a nitrogen inlet and a Dean-Starke trap with condenser. This mixture is stirred at 138°–140° C. for 2.0 hr. A 0.2 g quantity of water is collected, leaving a calculated 59.0 g (0.398 mol) phthalic anhydride in the flask. A 57.4 g quantity (0.398 mol) of (30/70 cis/trans) 1,4-cyclohexanedimethanol is added to the flask and a nitrogen atmosphere is established over the flask contents. The mixture is heated at 138°–140° C. for 12.0 hr and a 0.66 I.V. polyester is recovered by vacuum stripping the solvent.

EXAMPLE 6

Following the procedure described in Example 1, a polyester is prepared from a 1:1 molar ratio mixture of 1,2-cyclohexanedicarboxylic anhydride and (50/50 cis/trans) 1,3-cyclohexanedimethanol. The polyester is dark amber, transparent, and has an I.V. of 0.51.

EXAMPLE 7

Following the procedure described in Example 1, a polyester is prepared from a 1:1 molar ratio mixture of 2,3-norbornanedicarboxylic anhydride and (30/70 cis/trans) 1,4-cyclohexanedimethanol. The polyester is pale yellow, transparent, and has an I.V. of 0.81.

EXAMPLE 8

Following the procedure described in Example 1, except omission of the initial heating step, a polyester is prepared from a 1:1 molar ratio mixture of 4-methylphthalic acid and 1,4-cyclohexanedimethanol (30/70 cis/trans ratio). The polyester is amber, transparent, and has an I.V. of 0.58.

EXAMPLE 9

Following the procedure described in Example 1, except the use of 0.2 wt. % n-butylstannoic acid instead of 1.0 wt. % p-toluenesulfonic acid as catalyst, a polyester is prepared from a 1:1 molar ratio mixture of phthalic anhydride and (30/70 cis/trans) 1,4-cyclohexanedimethanol. The polyester is amber, transparent and has an I.V. of 0.60.

The invention has been described in detail with particular reference to preferred embodiments thereof, but it will be understood that variations and modifications can be effected within the spirit and scope of the invention.

We claim:

1. A high molecular weight polyester suitable for use in forming shaped articles, said polyester having an inherent viscosity of greater than 0.4 and containing repeating units from a glycol component consisting essentially of 1,3-cyclohexanedimethanol, 1,4-cyclohexanedimethanol or mixtures thereof, and an acid component comprising at least 50 mole % of an alicyclic or aromatic dicarboxylic anhydride or corresponding acid having 6 to 30 carbon atoms.

2. A high molecular weight polyester according to claim 1 wherein the acid component is a dicarboxylic acid.

3. A high molecular weight polyester according to claim 1 wherein the acid component is an anhydride.

4. A high molecular weight polyester according to claim 1 wherein the acid component comprises at least 90 mole % of an alicyclic or aromatic dicarboxylic anhydride or corresponding acid having 6 to 30 carbon atoms.

5. A high molecular weight polyester according to claim 1 wherein the glycol component consists essentially of 1,4-cyclohexanedimethanol.

6. A high molecular weight polyester suitable for use in forming shaped articles, said polyester having an inherent viscosity of greater than 0.4 and containing repeating units from a glycol component consisting essentially of 1,3-cyclohexanedimethanol, 1,4-cyclohexanedimethanol or mixtures thereof, and an acid component comprising at least 50 mole %

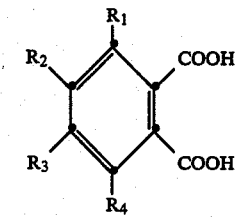

or

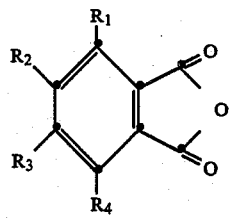

wherein $R_1$ through $R_4$ are each hydrogen, chlorine, bromine or alkyl groups containing 1 to 4 carbon atoms.

7. A molded object comprising the polyester of claim 1.

8. A molded object comprising the polyester of claim 6.

9. A coating composition comprising the polyester of claim 1.

10. A coating composition comprising the polyester of claim 6.

* * * * *